(12) United States Patent
Ueno

(10) Patent No.: US 8,500,325 B2
(45) Date of Patent: Aug. 6, 2013

(54) BUFFER MEMBER, SHOCK BUFFERING STRUCTURE OF ELECTRONIC DEVICE, AND ELECTRONIC DEVICE

(75) Inventor: Masato Ueno, Tama (JP)

(73) Assignee: Casio Computer Co., Ltd, Tokyo (JP)

( * ) Notice: Subject to any disclaimer, the term of this patent is extended or adjusted under 35 U.S.C. 154(b) by 25 days.

(21) Appl. No.: 13/347,761

(22) Filed: Jan. 11, 2012

(65) Prior Publication Data

US 2012/0176871 A1  Jul. 12, 2012

(30) Foreign Application Priority Data

Jan. 11, 2011 (JP) ................................ 2011-002838
Nov. 2, 2011 (JP) ................................ 2011-240979

(51) Int. Cl.
*G04B 37/00* (2006.01)

(52) U.S. Cl.
USPC ........................................................ 368/287

(58) Field of Classification Search
USPC ................. 368/287, 141, 286, 299, 300, 326, 368/276, 294–295, 280, 88, 281, 291, 292, 368/297, 309
See application file for complete search history.

(56) References Cited

U.S. PATENT DOCUMENTS 5,442,602 A * 8/1995 Hirai et al. ..................... 368/286
7,431,495 B2 * 10/2008 Cretin et al. ................... 368/287
7,708,457 B2 * 5/2010 Girardin et al. ............... 368/287

FOREIGN PATENT DOCUMENTS

JP       2000-046964       2/2000

* cited by examiner

*Primary Examiner* — Edwin A. Leon
(74) *Attorney, Agent, or Firm* — Turocy & Watson, LLP

(57) ABSTRACT

The present invention relates to a buffer member, a shock buffering structure of an electronic device, and an electronic device. A buffer member interposed between a wristwatch case and a watch module therein is composed of a viscoelastic body which, when the wristwatch case receives shock, reduces shock to be transmitted to the watch module by changing its shape while converting the kinetic energy to heat energy, and quickly reduces elastic force on the watch module by reducing the conversion of the kinetic energy to elastic energy accompanying the shape change. The viscoelastic body includes a first viscoelastic body section formed to cover the top and side surfaces of the module, a second viscoelastic body section arranged in predetermined portions of the first viscoelastic body section, and a third viscoelastic body section arranged along the inner peripheral edge of the top surface of the first viscoelastic body section.

14 Claims, 10 Drawing Sheets

FIG. 9

COMBINATIONS OF DEGREES OF HARDNESS OF ALPHA GEL

| | MODEL | TYPE | FIRST ALPHA GEL SECTION | SECOND ALPHA GEL SECTION | THIRD ALPHA GEL SECTION | CURVED LINE IN FIG. 10 |
|---|---|---|---|---|---|---|
| FIRST EMBODIMENT | DIGITAL | NORMAL SHOCK-ABSORBING | MEDIUM HARDNESS | MEDIUM HARDNESS | MEDIUM HARDNESS | F1 |
| | DIGITAL | HIGH SHOCK-ABSORBING | HIGH HARDNESS | HIGH HARDNESS | HIGH HARDNESS | F2 |
| SECOND EMBODIMENT | DIGITAL | NORMAL SHOCK-ABSORBING | MEDIUM HARDNESS | MEDIUM HARDNESS | MEDIUM HARDNESS | F1 |
| | DIGITAL | HIGH SHOCK-ABSORBING | HIGH HARDNESS | HIGH HARDNESS | HIGH HARDNESS | F2 |
| THIRD EMBODIMENT | ANALOG | NORMAL SHOCK-ABSORBING | MEDIUM HARDNESS | MEDIUM HARDNESS | LOW HARDNESS | F3 |
| | ANALOG | HIGH SHOCK-ABSORBING | HIGH HARDNESS | HIGH HARDNESS | MEDIUM HARDNESS | F4 |
| VARIATION EXAMPLE | — | LOW SHOCK-ABSORBING | LOW HARDNESS | LOW HARDNESS | LOW HARDNESS | F5 |

200~# BUFFER MEMBER, SHOCK BUFFERING STRUCTURE OF ELECTRONIC DEVICE, AND ELECTRONIC DEVICE

CROSS-REFERENCE TO RELATED APPLICATIONS

This application is based upon and claims the benefit of priority from the prior Japanese Patent Applications No. 2011-002838, filed Jan. 11, 2011 and No. 2011-240979, filed Nov. 2, 2011, the entire contents of which are incorporated herein by reference.

BACKGROUND OF THE INVENTION

1. Field of the Invention

The present invention relates to a buffer member that is used in an electronic device such as a wristwatch or a mobile phone and absorbs shock, a shock buffering structure of an electronic device, and an electronic device.

2. Description of the Related Art

Conventionally, a shock buffering structure of a wristwatch is known in which buffer members that have elasticity, such as rubber, are arranged in a plurality of areas between a wristwatch case and a watch module housed inside the wristwatch case, which absorb external shock to protect the watch module, as described in Japanese Patent Application Laid-Open (Kokai) Publication No. 2000-046964.

In this structure, some of the plurality of buffer members are arranged circularly in the peripheral edge portion of the top surface of the watch module and elastically absorb shock from the top surface side of the wristwatch case. The other buffer members are arranged in a plate shape on the undersurface of the watch module and elastically absorb shock from the undersurface side of the wristwatch case.

In a shock buffering structure of a wristwatch such as this, the buffer members are each composed of a material having elasticity, such as rubber. Therefore, when the wristwatch case receives an external shock, the shock is absorbed by the elastic deformation of the plurality of buffer members by this shock. As this is a structure which buffers a shock, the impact resistance rate is heightened. However, there is a characteristic in that a shock is difficult to be absorbed or easily reduced. Accordingly, there is a problem in that a shock cannot be alleviated efficiently.

SUMMARY OF THE INVENTION

An object of the present invention is to provide a buffer member that efficiently absorbs shock, a shock buffering structure of an electronic device, and an electronic device.

In order to achieve the above-described object, in accordance with one aspect of the present invention, there is provided a shock buffering structure of an electronic device which absorbs shock by interposing a buffer member between a device case and a module housed inside the device case, wherein the buffer member is composed of a viscoelastic body which, when the device case receives shock, reduces the shock to be transmitted to the module by changing shape in proportion to a magnitude of the shock while converting kinetic energy to heat energy, and quickly reduces elastic force on the module by reducing conversion of the kinetic energy to elastic energy accompanying the shape change, and the viscoelastic body is composed of a first viscoelastic body section, a second viscoelastic body section, and a third viscoelastic body section, of which the first viscoelastic body section is formed into a cylindrical shape to cover a top surface and a side surface of the module, the second viscoelastic body section is arranged in predetermined portions of the first viscoelastic body section with space therebetween, and the third viscoelastic body section is arranged in a frame shape along an inner peripheral edge of a top surface of the first viscoelastic body section positioned on the top surface of the module.

According to the present invention, when the device case receives shock, the shape of the buffer member constituted by a viscoelastic body changes in proportion to the impact force, whereby shock to be transmitted to the module is reduced. In addition, elastic force on the module is quickly reduced. Therefore, in the present invention, shock is efficiently absorbed without the module being damaged.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6A and FIG. 6B are diagrams showing characteristics of Alpha GEL (registered trademark) that is a viscoelastic body and urethane resin shown in FIG. 5 against external force, in which FIG. 6A is a schematic diagram showing the time-dependent changes of shock acceleration applied to the watch module when shock as external force is applied to Alpha GEL and urethane resin, and FIG. 6B is a schematic diagram showing the frequency characteristics of the transmissibility of acceleration transmitted to the watch module when harmonic vibrations are applied to Alpha GEL and urethane resin;

FIG. 9 is a diagram showing combinations of the hardness of first to third Alpha GEL sections in the first to third embodiments.

DETAILED DESCRIPTION OF THE PREFERRED EMBODIMENTS

First Embodiment

A first embodiment in which the present invention has been applied to a digital wristwatch will hereinafter be described with reference to FIG. 1 to FIG. 6.

Figure 1:
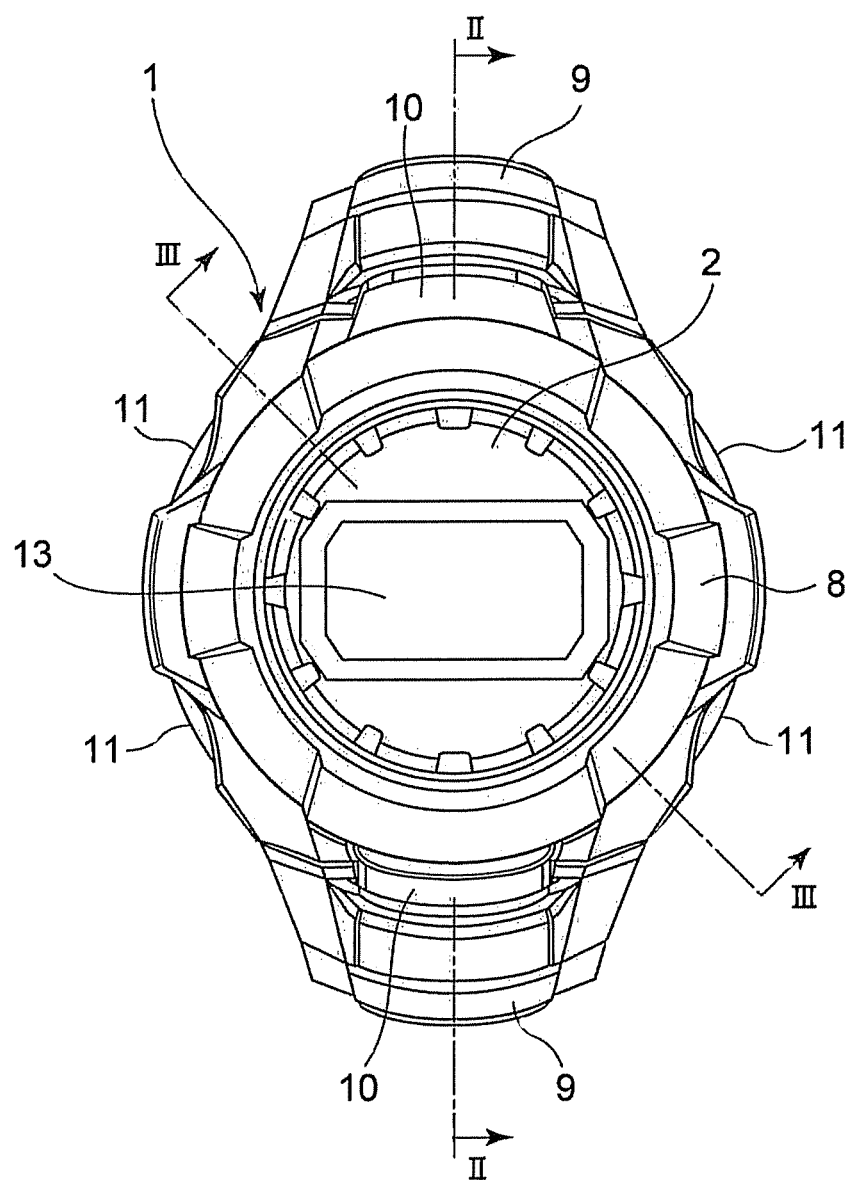
FIG. 1 is a front view of a first embodiment in which the present invention has been applied to a digital wristwatch.
Figure 2:
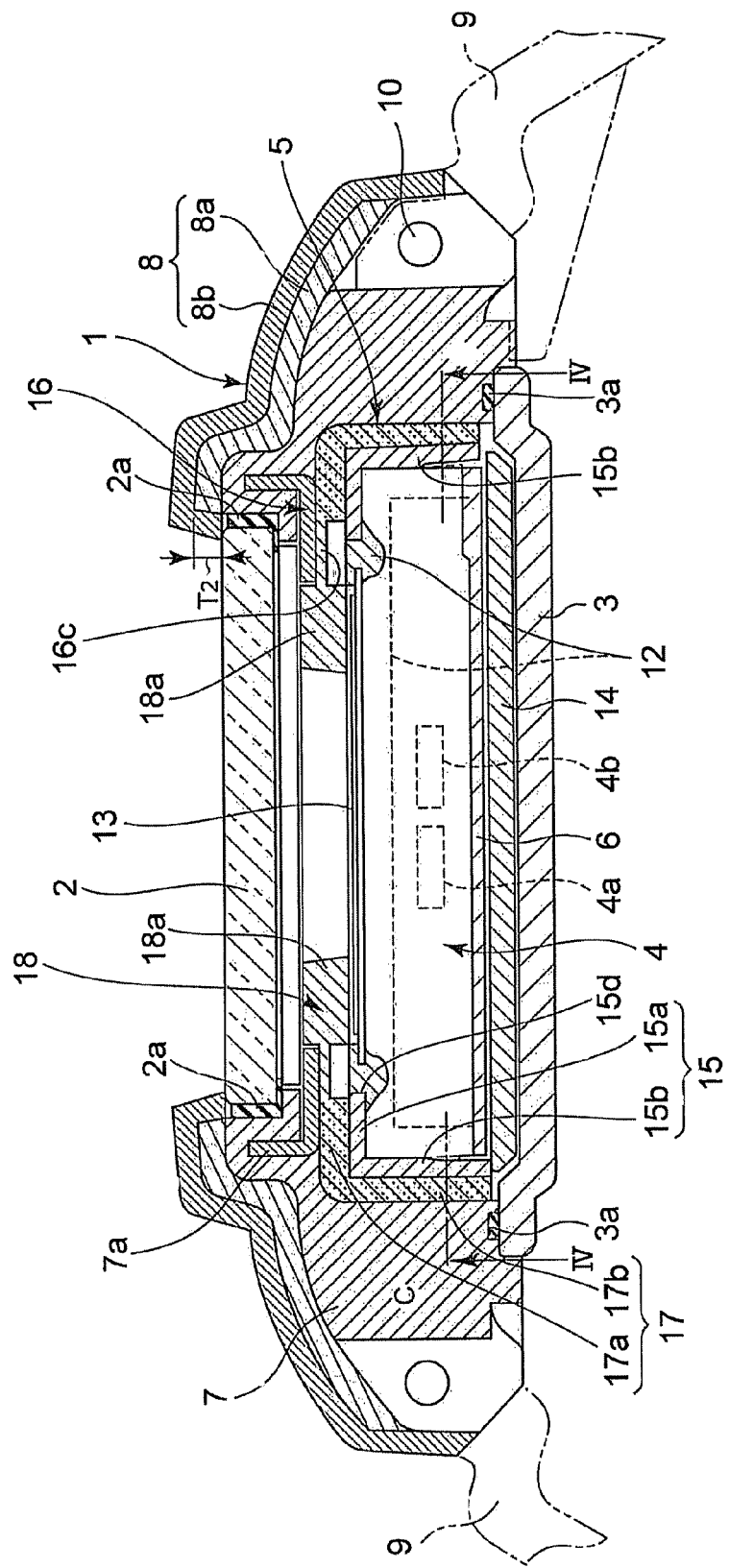
FIG. 2 is an enlarged cross-sectional view of the wristwatch taken along line II-II in FIG. 1.
Figure 3:
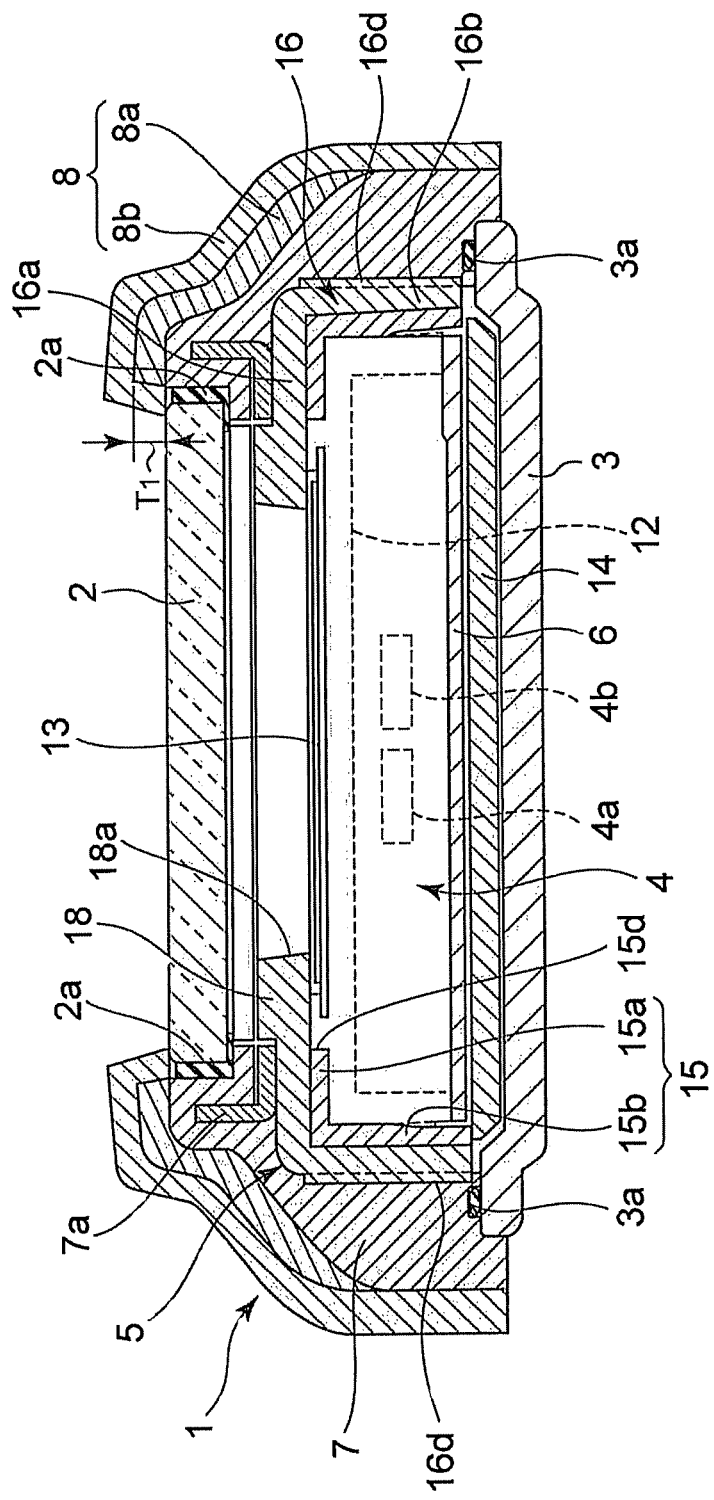
FIG. 3 is an enlarged cross-sectional view of the wristwatch taken along line III-III in FIG. 1.

As shown in FIG. 1 to FIG. 3, this wristwatch includes a wristwatch case 1. The top opening portion of the wristwatch case 1 (device case) has a watch crystal 2 (protective glass) mounted therein via a gasket 2a, and the underside of the wristwatch case 1 has a back cover 3 attached thereto via a waterproofing ring 3a. Inside the wristwatch case 1, a watch module 4 is arranged via a buffer member 5 and a cushion member 6.

The wristwatch case 1 includes a case body 7 composed of a hard synthetic resin, and a two-layer structure bezel 8 provided on the outer peripheral surface of the case body 7, as shown in FIG. 2 and FIG. 3. In the case body 7, a metal reinforcement member 7a is provided projecting inwards from the inner upper portion, by insert molding. The bezel 8 is constituted by an inner bezel 8a and an outer bezel 8b. The inner bezel 8a is composed of Alpha GEL (registered trademark) described hereafter and provided on the outer peripheral surface of the case body 7. The outer bezel 8b is composed of a synthetic resin having elasticity and provided on the outer front surface of the inner bezel 8a.

Figure 4:
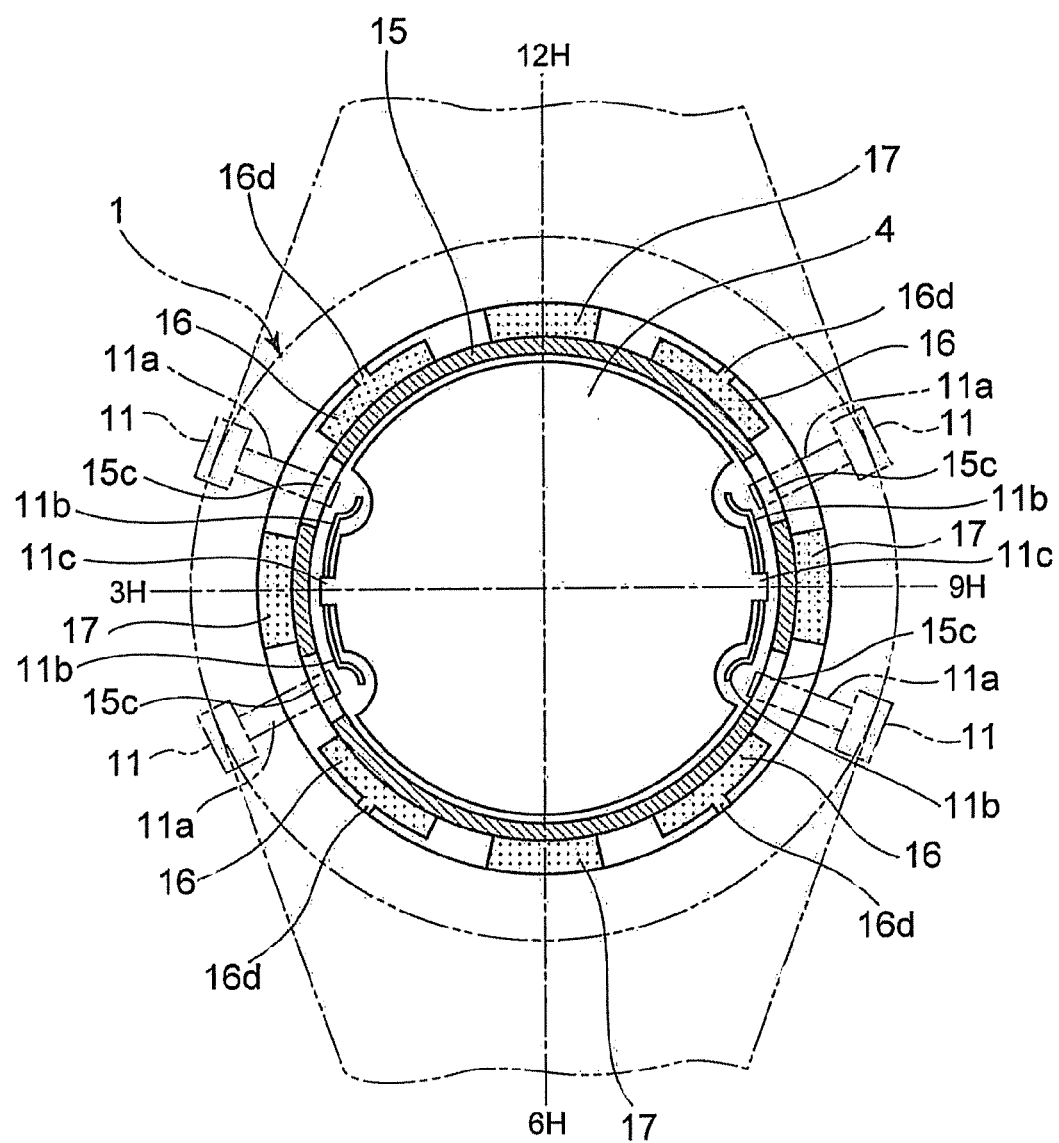
FIG. 4 is an enlarged cross-sectional view of the wristwatch taken along line IV-IV in FIG. 2, in which a horizontal cross-section of a watch module, a pressing member, and a buffer member is shown.

Also, the 12 o'clock side and the 6 o'clock side of the wristwatch case 1 are respectively provided with a band attaching section 10 for attaching a watch band 9, as shown in FIG. 1 and FIG. 2. In addition, the 3 o'clock side and the 9 o'clock side of the wristwatch case 1 are respectively provided with two push-button switches 11, as shown in FIG. 1 and FIG. 4.

The outer periphery of the watch module 4 is covered by a housing 12 composed of a hard synthetic resin as shown in FIG. 2 and FIG. 3, and a display panel 13 that electro-optically displays information such as time is provided on the top portion of the housing 12. The display panel 13 is constituted by a flat-surface display element, such as a liquid crystal display element or an electroluminescent (EL) display element.

Inside the housing 12, an electronic circuit section 4a for driving the display panel 13 and various electronic components 4b required for a clock function are mounted. The side surface of the housing 12 is provided with a terminal member 11c, as shown in FIG. 4. The terminal member 11c includes a terminal plate lib which is provided on the outer periphery of the housing 12 and operated by being pressed inwards by the two push-button switches 11 described hereafter.

As shown in FIG. 2 and FIG. 3, the watch module 4 is housed inside the wristwatch case 1 with the outer peripheral surface of the housing 12 which covers the outer periphery of the watch module 4 being covered by the buffer member 5 via a pressing member 15 described hereafter. In addition, the undersurface of the watch module 4 is arranged so as to be pressed against the wristwatch case 1 by the back cover 3, with the cushion member 6 being pressed by a pressing plate 14. In this instance, the cushion member 6 is composed of an elastic material such as rubber, and has a plate shape.

The pressing member 15 is composed of a hard synthetic resin such as polyacetal (POM), or metal, and includes a ring-shaped section 15a and a cylindrical section 15b that are integrally formed, as shown in FIG. 2 and FIG. 3. The ring-shaped section 15a is arranged on the peripheral edge portion of the top surface of the housing 12 of the watch module 4, and the cylindrical section 15b is arranged on the outer peripheral surface of the housing 12.

The pressing member 15 provides a mitigating function by which the concentration of impact force in one portion of the watch module 4 is mitigated by the pressing member 15 as a whole receiving impact force when the wristwatch case 1 receives external shock. The inner peripheral surface of the pressing member 15 is provided with a positioning projection or recess (not shown) for positioning the watch module 4 in a predetermined area in the wristwatch case 1, and as a result the pressing member 15 also provides a positioning function for preventing the watch module 4 from rotating in a horizontal direction in the wristwatch case 1, and determining the position of the watch module 4 relative to the wristwatch case 1.

Figure 5:
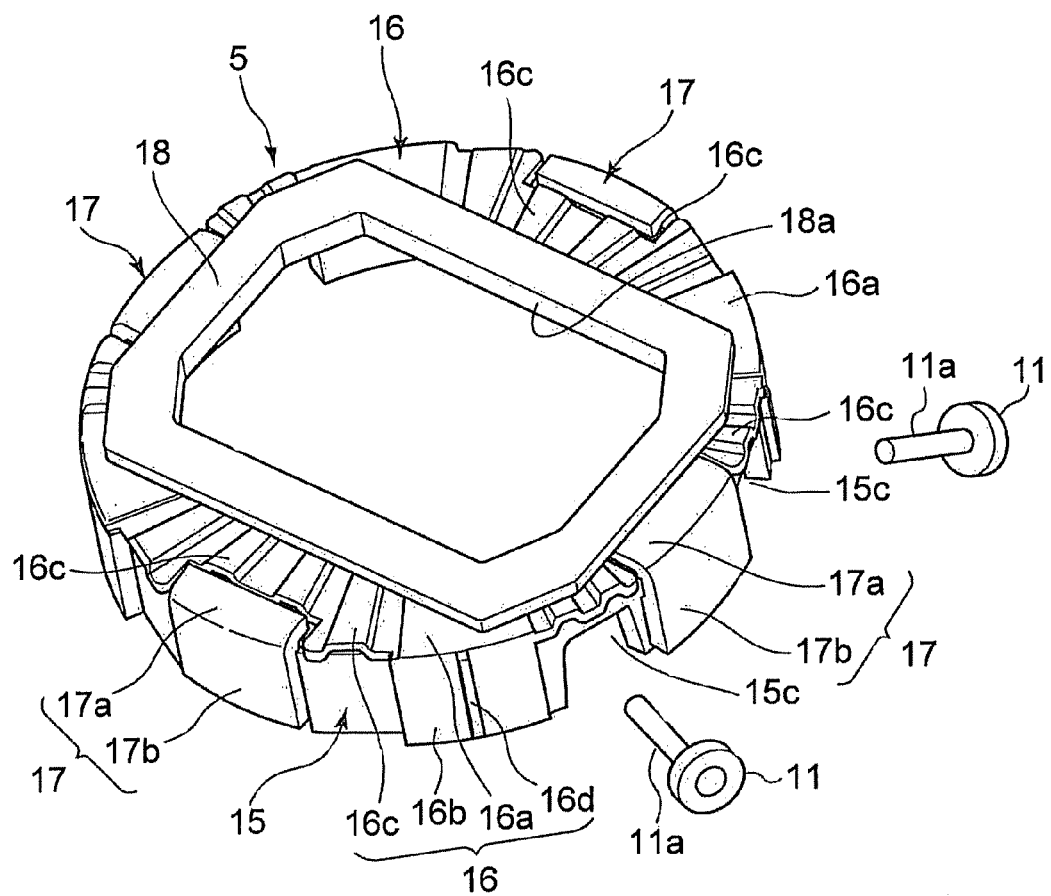
FIG. 5 is an enlarged perspective view of the pressing member of the watch module and the buffer member shown in FIG. 4.

The 3 o'clock side and the 9 o'clock side of the cylindrical section 15b of the pressing member 15 are provided with notched sections 15c that serve as a clearance space when shaft sections 11a of the plurality of push-button switches 11 are inserted, as shown in FIG. 1 and FIG. 5. In this instance, a display opening section 15d is provided in the center portion of the ring-shaped section 15a in the top surface of the pressing member 15, corresponding to the display panel 13, as shown in FIG. 2 and FIG. 3. As a result, the display panel 13 is exposed upwards from the display opening section 15d, with the top surface thereof being on the same plane as the top surface of the pressing member 15.

The buffer member 5 is arranged between the pressing member 15 on the outer peripheral surface of the housing 12 of the watch module 4 and the inner peripheral surface of the wristwatch case 1, as shown in FIG. 2 to FIG. 5. This buffer member 5 is composed of a viscoelastic body whose shape changes when the wristwatch case 1 receives an external shock, and is preferably composed of Alpha GEL.

Here, Alpha GEL will be described.

Alpha GEL is a gel material whose main ingredient is silicone, which is, for example, a sheet-shaped material composed of silicone gel mixed with filler that is a filling material. In this instance, the filler is, for example, composed of 1 to 3 parts by weight of hollow micro-bodies having a synthetic resin outer shell and 10 to 30 parts by weight of silica, relative to 100 parts by weight of silicone gel.

The gel material has a hardness of 15 to 60 on the Asker C scale and a thickness of, for example, about 0.5 mm to 2.0 mm. The shock buffering rate indicating the rate of reduction in shock acceleration when the gel material is used as a shock buffering material is 70% or more, compared to that of when the gel material is not used as a shock buffering material.

The force of impact when a rigid body object, such as a wristwatch, is dropped directly onto a rigid surface is ordinarily a very large delta function value, as a result of the drop velocity changing to zero or upward velocity in an extremely short amount of time. On the other hand, when an elastic body such as that composed of urethane resin is dropped and comes in contact with a rigid surface, repulsive force corresponding to the deformation volume in the vertical direction of the urethane resin, or in other words, repulsive force corresponding to the retraction distance is generated, and thereby the upward acceleration gradually increases and the acceleration of the wristwatch decelerates, as indicated by dashed line U in FIG. 6A.

Then, the velocity of the wristwatch and the urethane resin changes from downward velocity to upward velocity, and the wristwatch and the urethane resin rebound. Therefore, the shock acceleration applied to the wristwatch forms a waveform that is distributed from when the urethane resin is dropped and comes in contact with the rigid surface to when the urethane resin retracts, rebounds, and moves away from the rigid surface, and the peak value of the shock acceleration decreases significantly compared to when the wristwatch is directly dropped.

Figure 6A:
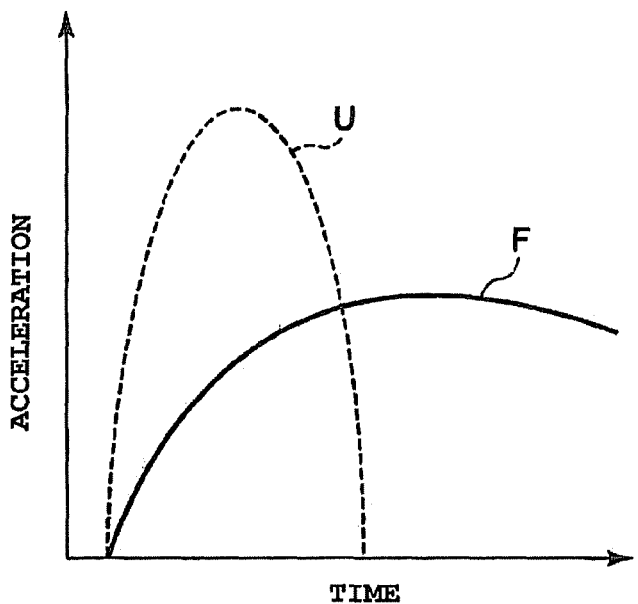

On the other hand, when a viscoelastic body such as that composed of Alpha GEL is dropped and comes in contact with a rigid surface, the increase in force applied to the watch module 4 inside the wristwatch case 1 is delayed and the peak value is low compared to when an elastic body such as that composed of urethane resin is used, as indicated by solid line F in FIG. 6A. That is, the modulus of the elasticity of Alpha GEL is lower than that of an elastic body composed of urethane resin.

In general, gel-like viscoelastic bodies, such as Alpha GEL, have a significantly lower modulus of elasticity compared to elastic bodies (smaller by about two to four figures in Young's modulus). In addition, in a case where an elastic body having a low modulus of elasticity is used, the thickness is required to be increased so that a large distortion that occurs when impact is received does not exceed the elastic limit.

On the other hand, when Alpha GEL is dropped onto a rigid surface and receives upward force therefrom, it is deformed by being compressed from both sides by impact force from the rigid surface and the inertial force of the wristwatch, while quickly and efficiently converting energy received from the rigid surface and kinetic energy received from the wristwatch to heat energy and discharging the heat energy, as indicated by the solid line F in FIG. 6A. That is, Alpha GEL quickly dampens the kinetic energy by decelerating the wristwatch with viscous resistance. In addition, increase in the elastic force accompanying the compressive deformation of Alpha GEL is slowed by decrease in the deformation speed caused by the deceleration of the wristwatch and the elapse of the relaxation time.

As a result, the conversion from kinetic energy to elastic energy is kept to a small amount, and the watch module 4 in the wristwatch case 1 quickly stops without rebounding in the upward vertical direction. That is, the peak value of upward acceleration transmitted to the watch module 4 via the thin layer of Alpha GEL upon when drop impact is received decreases, and the kinetic energy of the watch module 4 quickly becomes zero. Note that, in the series of processes described above, the thickness of Alpha GEL, the installation area of Alpha GEL, and the material of Alpha GEL can be adjusted accordingly based on known techniques to set the optimal peak value of acceleration.

Figure 6B:
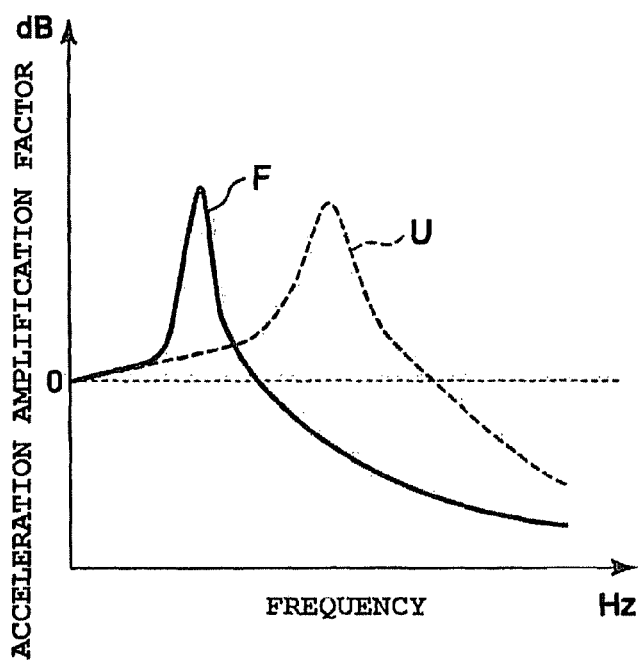

FIG. 6B shows, on the vertical axis, an amplification factor (vibration transmissibility) indicating a ratio of vibration acceleration applied to the wristwatch to vibration acceleration applied to urethane resin and Alpha GEL when harmonic vibrations of various frequencies are applied to elastic rubber composed of urethane resin and to the viscoelastic body composed of Alpha GEL (horizontal axis). In FIG. 6B, when the frequency is zero, the amplification factors are 0 dB, or in other words, 1 fold (vibration transmissibility is 1), and accelerations applied to the wristwatch are equal between when acceleration is directly applied to the wristwatch and when acceleration is applied via urethane resin and Alpha GEL.

In both cases of urethane resin (broken line U) and Alpha GEL (solid line F), the amplification factors gradually rise as the vibration frequency increases and ultimately reach their peak value. The frequency indicating this peak value is a natural frequency (resonance frequency) determined by the modulus of elasticity of urethane resin or Alpha GEL and the mass of the wristwatch. When the vibration frequency rises further, the amplification factors decrease. When the vibration frequency exceeds a predetermined value ($\sqrt{2}$-fold of the natural frequency), the respective amplification factors become less than 0 dB.

That is, the acceleration applied to urethane resin and Alpha GEL is more efficiently absorbed and converted to heat by urethane resin and Alpha GEL as the vibration frequency departs from the natural frequency. The acceleration applied to the wristwatch becomes smaller than the acceleration applied to urethane resin and Alpha GEL.

Here, according to the above-described difference in the modulus of elasticity, the natural frequency when Alpha GEL is used is lower than the natural frequency when urethane resin is used, as shown in FIG. 6B. Therefore, vibration-control effect area in which the amplification factor becomes less than 0 dB appears at a lower frequency when Alpha GEL is used. Specifically, the vibration-control effect area according to the first embodiment that can be used in a wristwatch is about 140 Hz or more.

In this case, high-frequency vibrations at this frequency or higher easily causes malfunctions, noise, and electromagnetic noise in the components of the drive circuit and electronic components related to the watch module 4. However, these high-frequency vibrations, which cause malfunctions, noise, and electromagnetic noise in the components of the drive circuit and electronic components related to the watch module 4, can be more efficiently eliminated through use of a viscoelastic body such as Alpha GEL. Note that the vibration-control effect area, or in other words, the natural frequency can be set higher than the above-described setting value when the effects of vibration are small due to the configuration of the electronic components included in the watch module 4.

Also note that, although urethane resin is given as an example of the elastic body and Alpha GEL is given as an example of the viscoelastic body in the description above, many polymerized plastic materials have viscoelastic properties, and materials in which viscous properties are stronger than elastic properties can be used as the viscoelastic body of the present invention. That is, the viscoelastic body refers to a material having a shock buffering rate of, for example, 50% or higher.

The buffer member 5 of the first embodiment has a first Alpha GEL section 16 (first viscoelastic body section), a second Alpha GEL section 17 (second viscoelastic body section), and a third Alpha GEL section 18 (third viscoelastic body section), as shown in FIG. 2 and FIG. 3. The first Alpha GEL section 16 is arranged in a predetermined portion of the outer peripheral surface of the pressing member 15. The second Alpha GEL section 17 is arranged in another predetermined portion of the outer peripheral surface of the pressing member 15, excluding the area of the first Alpha GEL section 16. The third Alpha GEL section 18 is arranged on the peripheral edge portion of the top surface of the display panel 13 exposed from the opening section 15d of the pressing member 15. These sections are integrally formed using the same material.

The first Alpha GEL section 16 has a top surface section 16a arranged on the top surface of the ring-shaped section 15a of the pressing member 15 and a plurality of side surface sections 16b arranged on predetermined portions of the outer peripheral surface of the cylindrical section 15b of the pressing member 15, and the overall first Alpha GEL section 16 is formed into a substantially cylindrical shape, as shown in FIG. 2 to FIG. 5. In this instance, wave-shaped auxiliary buffer sections 16c are radially provided in the top surface section 16a, as shown in FIG. 5.

The auxiliary buffer section 16c is formed into a wave shape with a thickness that is thinner than the thickness of the top surface section 16a, as shown in FIG. 2. The overall thickness of the auxiliary buffer section 16c is slightly thicker than the thickness of the top surface section 16a of the first Alpha GEL section 16. As a result, when the auxiliary buffer section 16c, which is interposed between the top surface of the pressing member 15 and the undersurface of the reinforcement member 7a of the wristwatch case 1, is pressed by the reinforcement member 7a, it elastically deforms such that the wave shape is elastically flattened along with the shape change of the top surface section 16a of the first Alpha GEL section 16, and thereby changes its shape.

The side surface section 16b of the first Alpha GEL section 16 has an auxiliary buffer projection section 16d provided along the up-down direction, as shown in FIG. 4 and FIG. 5. This auxiliary buffer projection section 16d is provided on predetermined portions of the outer peripheral surface of the cylindrical section 15b of the pressing member 15 which are in the vicinities of the 1 o'clock position, the 5 o'clock position, the 7 o'clock position, and the 11 o'clock position, as shown in FIG. 4. The tip end surface of the auxiliary buffer projection section 16d comes into contact with the inner peripheral surface of the wristwatch case 1, thereby elastically separating the side surface section 16b of the first Alpha GEL section 16 from the inner peripheral surface of the wristwatch case 1, as shown in FIG. 4.

That is, the auxiliary buffer projection section 16d is formed having substantially the same height as the outer surface of the second Alpha GEL section 17 described hereafter. Accordingly, the side surface section 16b of the first Alpha GEL section 16 is structured such that the auxiliary buffer projection section 16d comes into contact with the inner peripheral surface of the wristwatch case 1, whereby the watch module 4 is restrained from accidentally moving in the plane direction (horizontal direction) and rattling. In this structure, when the auxiliary buffer projection section 16d is pressed by the inner peripheral surface of the wristwatch case 1, the auxiliary buffer projection section 16d changes its shape with the second Alpha GEL section 17 and comes into elastic contact with the inner peripheral surface of the wristwatch case 1.

The second Alpha GEL section 17 is arranged on four portions of the pressing member 15 corresponding to the 12 o'clock position, the 3 o'clock position, the 6 o'clock position, and the 9 o'clock position, with space therebetween, as shown in FIG. 2 to FIG. 5. That is, the second Alpha GEL section 17 has an upper piece section 17a arranged on the top surface of the ring-shaped section 15a of the pressing member 15 and a side piece section 17b arranged on the outer surface of the cylindrical section 15b of the pressing member 15.

In this instance, the upper piece section 17a of the second Alpha GEL section 17 is formed thicker than the thickness of the top surface section 16a of the first Alpha GEL section 16, and the thickness of which is substantially the same as the overall thickness of the wave-shaped auxiliary buffer section 16c in the top surface section 16a of the first Alpha GEL section 16, as shown in FIG. 2. In addition, the side piece section 17b of the second Alpha GEL section 17 is formed thicker than the side surface section 16b of the first Alpha GEL section 16, as shown in FIG. 2.

The third Alpha GEL section 18 is formed into a substantially rectangular frame shape corresponding to the display panel 13 of the watch module 4, as shown in FIG. 5. The outer peripheral portion of the third Alpha GEL section 18 is connected to the inner peripheral portion of the top surface section 16a of the first Alpha GEL section 16, as shown in FIG. 2 and FIG. 3. As a result, the third Alpha GEL section 18 is arranged to straddle the peripheral edge portion of the top surface of the display opening section 15d provided in the ring-shaped section 15a of the pressing member 15 and the peripheral edge portion of the top surface of the display panel 13 exposed from the opening section 15d of the pressing member 15.

The peripheral edge portion of the third Alpha GEL section 18 is formed into a parting section 18a that presses the peripheral edge of the top surface of the display panel 13, as shown in FIG. 2 and FIG. 3. The third Alpha GEL section 18 is formed thicker than the top surface section 16a of the first Alpha GEL section 16 by an amount equivalent to the thickness of the reinforcement member 7a of the wristwatch case 1. In addition, the third Alpha GEL section 18 is arranged further inward than the inner peripheral surface of the case body 7 of the wristwatch case 1. In this state, the third Alpha Gel section 18 is visible from outside, through the watch crystal 2.

Therefore, when external shock is applied to the wristwatch case 1, the first Alpha GEL section 16 to third Alpha GEL section 18 change their shape in proportion to the impact force while converting the kinetic energy to heat energy, and thereby reduce repulsive force that is transmitted to the watch module 4. Then, after this, the first Alpha GEL section 16 to third Alpha GEL section 18 gradually return to their original shapes. Accordingly, the first Alpha GEL section 16 to third Alpha GEL section 18 also suppress damped vibrations caused by elastic force.

On the other hand, as in the case of the buffer member 5, the inner bezel 8a of the bezel 8 is composed of a viscoelastic body that changes its shape when shock is received and is preferably composed of Alpha GEL. As shown in FIG. 2 and FIG. 3, thickness T1 of portions of the inner bezel 8a located in the right and left directions of the front surface of the wristwatch case 1, or in other words, the thickness T1 of portions of the inner bezel 8a located on the 3 o'clock side and the 9 o'clock side is formed thicker than thickness T2 of portions of the inner bezel 8a located in the front and back directions of the front surface of the wristwatch case 1, or in other words, the thickness T2 of portions of the inner bezel 8a located on the 12 o'clock side and the 6 o'clock side (T1>T2). That is, portions of the inner bezel 8a located on the 3 o'clock side and the 9 o'clock side are formed to project upwards. The outer bezel 8b is composed of a synthetic resin, such as urethane resin having high hardness.

Accordingly, the wristwatch according to the first embodiment of the present invention includes at least the wristwatch case 1, the watch crystal 2, the back cover 3, and the bezel 8 having the inner bezel 8a and the outer bezel 8b, from among components enclosing the watch module 4, thereby forming a shock buffering structure. In addition, the wristwatch according to the first embodiment further includes the buffer member 5 having the first Alpha GEL section 16 to third Alpha GEL section 18, thereby forming a two-layer shock buffering structure. Therefore, the wristwatch according to the first embodiment can further efficiently reduce shock to be transmitted to the watch module 4 while maintaining a very thin structure.

As described above, in the shock buffering structure of this wristwatch, the buffer member 5 is provided that is interposed between the wristwatch case 1 and the watch module 4 housed inside the wristwatch case 1. This buffer member 5 is composed of a viscoelastic body which, when the wristwatch case 1 receives external shock, reduces shock to be transmitted to the watch module 4 by changing its shape in proportion to the magnitude of the external shock while converting the kinetic energy to heat energy, and quickly reduces elastic force on the watch module 4 by reducing the conversion of the kinetic energy to elastic energy accompanying the shape change. Therefore, it efficiently absorbs shock to be applied to the watch module 4.

That is, in the shock buffering structure of this wristwatch, when the wristwatch case 1 receives external shock, the buffer member 5 composed of a viscoelastic body changes its shape in proportion to the magnitude of the shock while converting the kinetic energy to heat energy, whereby shock to be transmitted to the watch module 4 is reduced. In addition, conversion of the kinetic energy to elastic energy accompanying the shape change of the buffer member 5 is reduced, whereby elastic force on the watch module 4 is quickly reduced. Consequently, in this shock buffering structure, shock to be applied to the watch module 4 is efficiently absorbed.

Specifically, Alpha GEL, which is a viscoelastic body providing an excellent shock absorbing function, converts shock acceleration at the time of impact to heat energy, and reduces the kinetic energy. The shock acceleration is slowly decelerated. As a result, a strong repulsive force that causes the wristwatch case 1 to rebound is not formed. Therefore, compared to when the viscoelastic body is not used, or in other words, when shock applied to the wristwatch case 1 is directly applied to the watch module 4 or when an elastic body such as rubber is used, shock acceleration to be applied to the watch module 4 is significantly reduced.

The shock buffering rate indicating the rate of reduction in shock acceleration when the gel material is used as the buffer member 5 is 70% or more, compared to that of when the gel material is not used as the buffer member 5. On the other hand, shock acceleration to be applied to the watch module 4 when external shock is applied to the watch module 4 via the buffer member 5 is 50% or less, and preferably 30% or less, compared to shock acceleration to be applied to the watch module 4 when external shock is applied to the watch module 4 without the buffer member 5. Here, the buffer member 5 absorbs and disperses a portion of the shock by converting it to heat, and transmit the remaining shock to the watch module 4 such that it is delayed and dispersed.

As described above, shock acceleration can be reduced to 50% or less and preferably 30% or less by using Alpha GEL for the buffer member 5. That is, a small amount of Alpha GEL, or in other words, Alpha GEL formed to be thin can significantly reduce shock to be applied to the watch module 4 when the wristwatch is dropped. When a thin buffer member 5 is used between the wristwatch case 1 and the watch module 4, the manufacturing cost is reduced. In addition, when Alpha GEL is used for the buffer member 5, the natural frequency of the wristwatch case 1 is significantly reduced, whereby damage to the internal circuits caused by high-frequency vibrations is suppressed.

In this instance, Alpha Gel of the buffer member 5 is structured to return to its original state after changing its shape in proportion to received shock. Therefore, when Alpha Gel receives shock and changes its shape, dampened vibrations are not generated. Accordingly, the watch module 4 is not adversely affected by dampened vibrations, and the watch module 4, the display panel 13 and various electronic components 4a and 4b mounted in the watch module 4 can be favorably protected.

Moreover, in the shock buffering structure of this wristwatch, Alpha GEL of the buffer member 5 arranged corresponding to the outer peripheral surface of the watch module 4 can be formed to be thin, within a range of 0.5 mm to 2.0 mm. In addition, high shock absorption and buffering effects can be achieved by Alpha GEL. Therefore, the thickness of the overall buffer member 5 protecting the watch module 4 can be made thin and does not become thicker than that in existing structures. As a result, the wristwatch case 1 can be prevented from becoming large, and the overall wristwatch can be made smaller.

Furthermore, in the shock buffering structure of this wristwatch, the pressing member 15 is arranged between the inner peripheral surface of the wristwatch case 1 and the outer peripheral surface of the watch module 4, and the buffer member 5 composed of Alpha GEL is arranged on the outer surface of the pressing member 15. Therefore, when the buffer member 5 composed of Alpha GEL is reducing shock, the pressing member 15 as a whole receives the shock, whereby the shock can be prevented from being concentrated in one portion of the watch module 4. By this structural feature as well, the watch module 4, and the display panel 13 and various electronic components 4a and 4b mounted in the watch module 4 can be favorably protected from shock.

In this instance, the buffer member 5 has the first Alpha GEL section 16 arranged on a predetermined portion of the top surface and the side surface of the pressing member 15 covering and protecting the watch module 4, the second Alpha GEL section 17 arranged in another predetermined portion of the side surface and the top surface of the pressing member 15 excluding the area of the first Alpha GEL section 16, and the third Alpha GEL section 18 arranged on the outer peripheral edge portion of the top surface of the display panel 13 and positioned on the inner peripheral end portion of the first Alpha GEL section 16. Therefore, shock from outside of the wristwatch case 1 can be effectively absorbed and reduced.

That is, the first Alpha GEL section 16 is formed into a substantially cylindrical shape and arranged on the top surface and the side surface of the watch module 4 excluding four portions corresponding to the 3 o'clock position, the 6 o'clock position, the 9 o'clock position, and the 12 o'clock position. The second Alpha GEL section 17 is arranged in four portions of the first Alpha GEL section 16 corresponding to the 3 o'clock position, the 6 o'clock position, the 9 o'clock position, and the 12 o'clock position, with space therebetween. The third Alpha GEL section 18 is arranged in a frame shape along the inner peripheral edge of the top surface of the first Alpha GEL section 16 on the top surface of the watch module 4. Therefore, the first Alpha GEL section 16 and the second Alpha GEL section 17 effectively absorb and reduce shock received from the side, and the third Alpha GEL section 18 effectively absorbs and reduces shock received from above.

In this instance, the thicknesses of the first Alpha GEL section 16 to third Alpha GEL sections 18 differ. By this structural feature as well, shock from outside of the wristwatch case 1 can be effectively absorbed and reduced. For example, the second Alpha GEL section 17 is formed thicker than the first Alpha GEL section 16. Therefore, when the wristwatch case 1 receives external shock, the second Alpha GEL section 17 receives the shock before the first Alpha GEL section 16.

Accordingly, when the wristwatch case 1 receives external shock, the second Alpha GEL section 17 absorbs the shock such that the shock is dispersed. In addition, when the push-button switch 11 is pressed, the movement of the watch module 4 in the plane direction (horizontal direction) within the wristwatch case 1 caused by the pressing force of the push button switch 11 is restricted, whereby the watch module 4 is prevented from rattling. Therefore, switch operations can be smoothly and favorably performed.

Also, the auxiliary buffer projection section 16d for separating the side surface section 16b of the first Alpha GEL section 16 from the inner peripheral surface of the wristwatch case 1 is formed on the side surface section 16b to be substantially the same height as that of the outer surface of the side piece section 17 of the second Alpha GEL section 17. Therefore, when the wristwatch case 1 is not receiving shock, the watch module 4 inside the wristwatch case 1 is restrained from accidentally moving in the plane direction (horizontal direction) rattling.

Moreover, when the wristwatch case 1 receives shock from the side surface side, the impact force is substantially simultaneously applied to the side piece section 17b of the second Alpha GEL section 17 and the auxiliary buffer projection section 16d on the side surface section 16b of the first Alpha GEL section 16. Therefore, the auxiliary buffer projection section 16d changes its shape substantially simultaneously with the shape change of the second Alpha GEL section 17.

That is, the width of the auxiliary buffer projection section 16d in the circumferential direction of the side surface section 16b of the first Alpha Gel section 16 is narrow, and the auxiliary buffer projection section 16d has a shape elongated along the up-down direction. Therefore, the shape change of the auxiliary buffer projection section 16d is smaller than the shape change of the overall side surface section 16b, and the auxiliary buffer projection section 16d changes its shape more easily than the overall side surface section 16b. Accordingly, when the side surface section 16b of the first Alpha GEL section 16 receives impact force, the auxiliary buffer projection section 16d having a narrow width changes its shape with the side piece section 17b of the second Alpha GEL section 17.

Subsequently, the overall side surface section 16b of the first Alpha GEL section 16 changes its shape. Therefore, the shock received from the side surface side of the wristwatch case 1 is efficiently absorbed and reduced by the side piece section 17b of the second Alpha GEL section 17, the auxiliary buffer projection section 16d provided on the side surface section 16b of the first Alpha GEL section 16, and the side surface section 16b of the first Alpha GEL section 16.

Furthermore, the thin, wave-shaped auxiliary buffer section 16c is formed in the top surface section 16a of the first Alpha GEL section 16, and the overall thickness of this auxiliary buffer section 16c is formed thicker than that of the top surface section 16a of the first Alpha GEL section 16. Therefore, when the wristwatch case 1 receives shock from its top surface side, the impact force is substantially simultaneously applied to the first Alpha Gel section 16 and the auxiliary buffer section 16c. As a result, the top surface section 16a of the first Alpha GEL section 16 changes its shape, and the auxiliary buffer section 16c deforms elastically, whereby the shock is reliably and favorably absorbed.

Specifically, since the auxiliary buffer section 16c is formed into a thin wave shape in the top surface section 16a of the first Alpha GEL section 16, the elastic force of the auxiliary buffer section 16c is smaller than the shape change of the top surface section 16a, and the auxiliary buffer section 16c elastically deforms more easily than the top surface section 16a changes shape. Therefore, when the top surface section 16a of the first Alpha GEL section 16 receives impact force, the wave-shaped auxiliary buffer section 16c elastically deforms before the top surface section 16a of the first Alpha GEL section 16 changes its shape.

Subsequently, the overall top surface section 16a of the first Alpha GEL section 16 changes its shape. Accordingly, when the wristwatch case 1 receives a strong shock on its top surface side, the upper piece section 17a of the second Alpha GEL section 17 and the top surface section 16a of the first Alpha GEL section 16 easily change their shape by the elastic deformation of the auxiliary buffer section 16c, whereby the shock is reliably and favorably absorbed and reduced.

In this instance, the third Alpha GEL section 18 is formed thicker than the first Alpha GEL section 16. Therefore, when the watch crystal 2 of the wristwatch case 1 receives shock from above, the shock is absorbed by the third Alpha GEL section 18 to be dispersed, and then effectively absorbed and reduced by the third Alpha GEL section 18 and the first Alpha GEL section 16. As a result, the display panel 13 is reliably and favorably protected.

Also, in the buffer member 5, the first Alpha GEL section 16 to third Alpha GEL section 18 are integrally formed using the same Alpha GEL material. Therefore, the buffer member 5 can be simply and easily manufactured by a single mold for molding. In addition, since the first Alpha GEL section 16 to third Alpha GEL section 18 are integrally formed, the number of the components can be reduced, and the assembly operation can be simplified, whereby a product having high mass-productivity can be provided.

Moreover, in the shock buffering structure of this wristwatch, the bezel 8, which is an external component, is provided on the outer front surface of the wristwatch case 1. This bezel 8 is constituted by the inner bezel 8a which is the inner external portion provided on the outer surface of the wristwatch case 1 and the outer bezel section 8b which is the outer external portion provided on the outer peripheral surface of the inner bezel 8a. The inner bezel 8a is composed of Alpha GEL that changes its shape in proportion to impact force when the bezel 8 receives external shock. Accordingly, in this shock buffering structure, external shock is favorably absorbed and mitigated also by the inner bezel 8a that is composed of Alpha GEL.

In this instance as well, since the inner bezel 8a is composed of Alpha GEL, a high buffering effect is achieved without the outer shape of the overall bezel 8 becoming large. In addition, since the outer bezel 8b is composed of a synthetic resin having elasticity such as a hard urethane resin, not only is the surface of the bezel 8 not easily scratched, but the inner bezel 8a composed of Alpha GEL is also favorably protected.

Alpha GEL of the inner bezel 8a is formed such that the thickness T1 of portions of the inner bezel 8a located on the 3 o'clock side and the 9 o'clock side in the right and left directions of the front surface of the wristwatch case 1 is thicker than the thickness T2 of portions of the inner bezel 8a located on the 12 o'clock side and 6 o'clock side in the front and back directions of the front surface of the wristwatch case 1 (T1>T2). Therefore, although the 3 o'clock side and the 9 o'clock side of the wristwatch case 1 are likely to hit objects and receive strong shock when the wristwatch case 1 is worn on a wrist and used, the thick Alpha GEL of the inner bezel 8a can favorably absorb shock even if such a strong shock is received. Accordingly, by this structural feature as well, the watch module 4, and the display panel 13 and the electronic components 4a and 4b mounted in the watch module 4 are favorably protected from shock.

Second Embodiment

Next, a second embodiment in which the present invention has been applied to a digital wristwatch will be described with reference to FIG. 7. Sections that are the same as those of the first embodiment shown in FIG. 1 to FIG. 6B are described using the same reference numerals.

Figure 7:
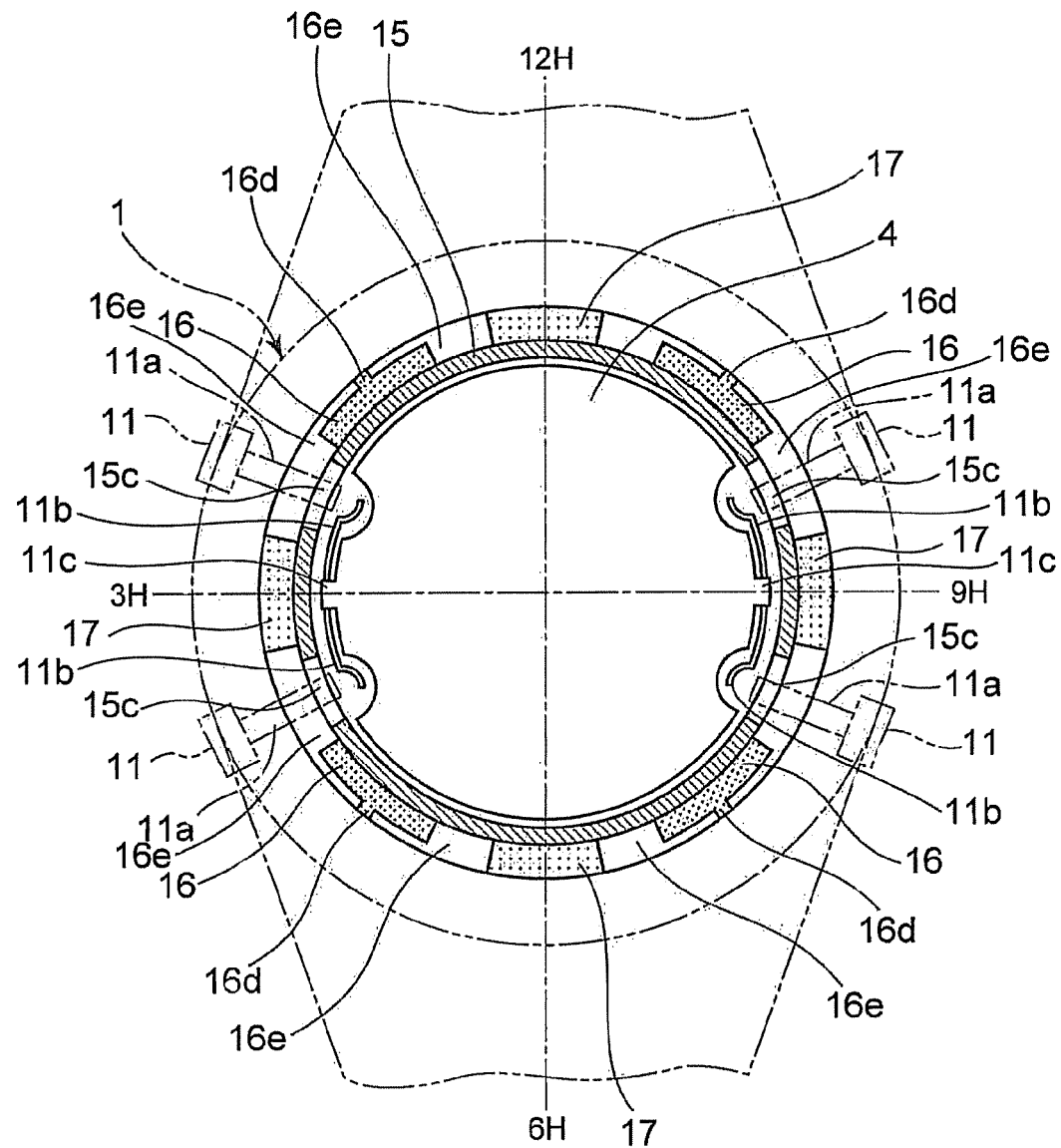
FIG. 7 is an enlarged cross-sectional view of a second embodiment where the present invention has been applied to a digital wristwatch, in which a horizontal cross-section of a pressing member of a watch module and a buffer member is shown.

In this wristwatch, among the first Alpha GEL section 16 to third Alpha GEL section 18 of the buffer member 5, the second Alpha GEL section 17 is formed separately, and arranged in four portions corresponding to the 3 o'clock position, the 6 o'clock position, the 9 o'clock position, and the 12 o'clock position with space therebetween, as shown in FIG. 7.

Specifically, the second Alpha GEL section 17 is composed of the same material as those of the first Alpha GEL section 16 and the third Alpha GEL section 18, and formed thicker than the first Alpha GEL section 18, as in the case of the first embodiment. As shown in FIG. 7, the second Alpha GEL section 17 is attached by adhesive glue on four portions of the outer peripheral surface of the pressing member 15 which correspond to the 3 o'clock position, the 6 o'clock position, the 9 o'clock position, and the 12 o'clock position, with space therebetween.

In this instance, a notched section 16e for arranging the second Alpha GEL section 17 is provided in four portions of the side surface section 16b of the first Alpha GEL section 16 which correspond to the 3 o'clock position, the 6 o'clock position, the 9 o'clock position, and the 12 o'clock position. The first Alpha GEL section 16 and the third Alpha GEL section 18 are integrally formed using the same material, and arranged on the outer peripheral surface of the pressing member 15 and the top surface of the watch module 4, as in the case of the first embodiment.

As described above, in the shock buffering structure of the wristwatch according to the second embodiment, the second Alpha GEL section 17 is formed separately, among the first Alpha GEL section 16 to third Alpha GEL section 18 of the buffer member 5. Therefore, the first Alpha GEL section 16 and the third Alpha GEL section 18 can be mounted to the watch module 4 separately from the second Alpha GEL section 17. As a result, the assembly operability is improved.

That is, in this shock buffering structure, the second Alpha GEL section 17 can be individually fixed by adhesive glue on the four portions of the pressing member 15 corresponding to the 3 o'clock position, the 6 o'clock position, the 9 o'clock position, and the 12 o'clock position with space therebetween. In addition, The positions of the first Alpha GEL section 16 and the third Alpha GEL section 18 can be favorably adjusted by these sections being mounted to cover the pressing member 15 and the watch module 4 from above, and moved to rotate along the outer peripheral surface of the pressing member 15.

For example, in a case where the first Alpha GEL section 16 to third Alpha GEL section 18 have been integrally formed as in the first embodiment, the first Alpha GEL section 16 to third Alpha GEL section 18 are not easily moved and rotated along the outer peripheral surface of the pressing member 15 when these sections are mounted to cover the pressing member 15 and the watch module 4, due to frictional resistance. Therefore, the adjustment of the attachment positions is difficult in this case.

In contrast, in the case where the second Alpha GEL section 17 has been formed separately from the first Alpha GEL section 16 and the third Alpha GEL section 18, the second Alpha GEL section 17 can be fixed to the pressing member 15 individually. Therefore, frictional resistance caused by the second Alpha GEL section 17 does not occur when the first Alpha GEL section 16 and the third Alpha GEL section 18 are moved to rotate along the outer peripheral surface of the pressing member 15. Accordingly, the first Alpha GEL section 16 and the third Alpha GEL section 18 can be easily moved and rotated, whereby the positions thereof can be accurately adjusted.

Third Embodiment

Next, a third embodiment in which the present invention has been applied to an analog wristwatch will be described with reference to FIG. 8. In this instance as well, sections that are the same as those of the first embodiment shown in FIG. 1 to FIG. 6B will be described using the same reference numerals.

In this wristwatch, a watch movement 20 is mounted in place of the display panel 13 mounted on the watch module 4. Other structures are substantially the same as those of the first embodiment.

Figure 8:
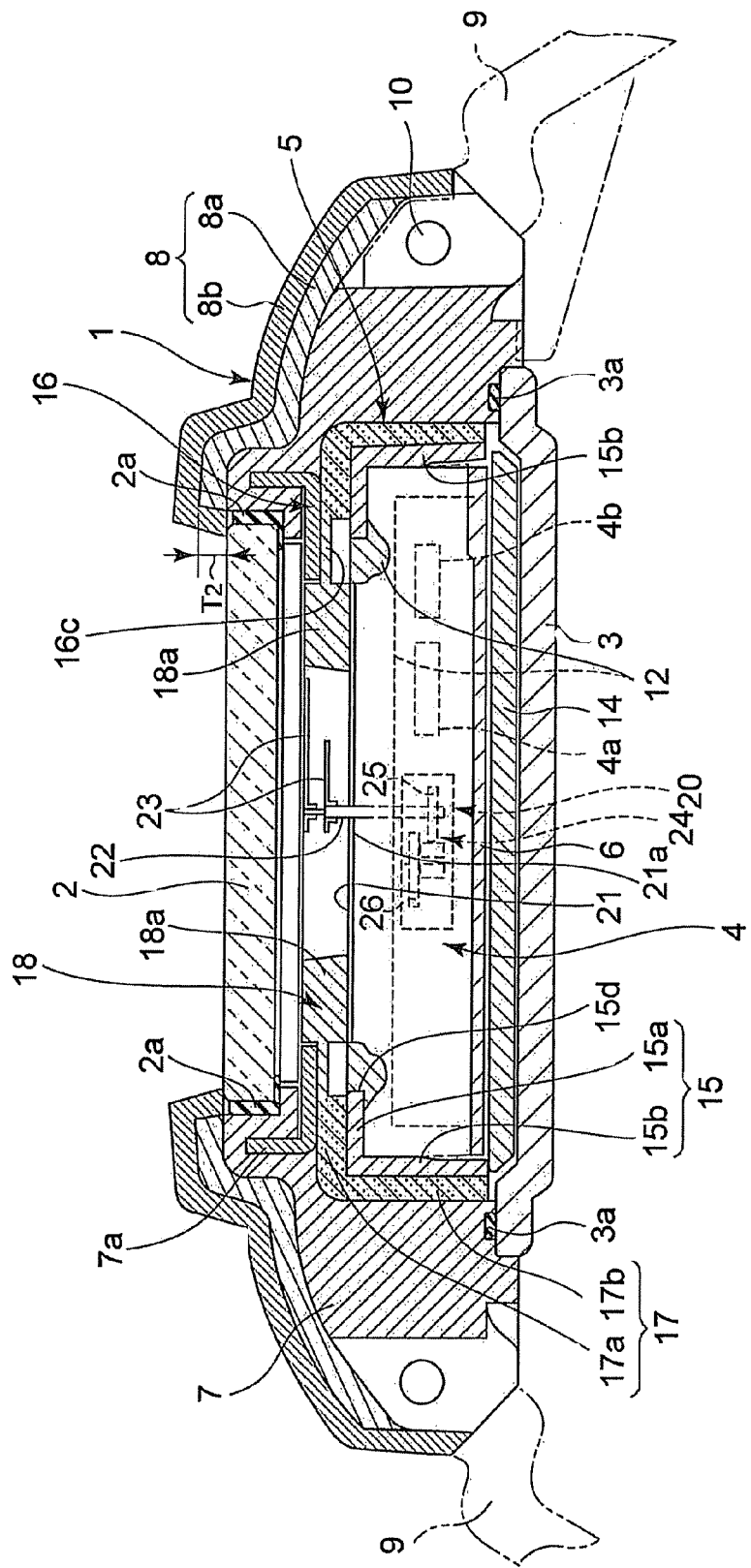
FIG. 8 is an enlarged cross-sectional view of a third embodiment where the present invention has been applied to an analog wristwatch, in which a vertical cross-section taken along the 12 o'clock and 6 o'clock directions is shown.

This watch movement 20 includes a hand shaft 22, hands 23, and a gear train mechanism 24, and mounted in the housing 12 of the watch module 4, as shown in FIG. 8. The hand shaft 22 protrudes upward from a through-hole 21a in a dial 21 arranged on the top surface of the housing 12. The hands 23 are an hour hand and a minute hand attached to the upper end portion of the hand shaft 22. The gear train mechanism 24 is used to rotate the hand shaft 22 to move the hands 23. Accordingly, the watch movement 20 is structured such that the gear train mechanism 24 rotates the hand shaft 22, and the hands 23 move above the dial 21 by the rotation of the hand shaft 22, whereby the time is indicated and displayed.

In this instance, the gear train mechanism 24 includes a hand gear 25 that is attached to the hand shaft 22 and rotates, a transmitting gear 26 that engages with the hand gear 25 and rotates, a stepped motor (not shown) that rotates the transmission gear 26, etc. The hand gear 25 and the transmission gear 26 are disposed in a horizontal direction perpendicular to the hand shaft 22. In this state, the teeth portions of the outer peripheral portions of the hand gear 25 and the transmission gear 26 engage with each other, and the hand gear 25 and the transmission gear 26 rotate.

The dial 21 is arranged corresponding to the display opening 15d provided in the ring-shaped section 15a of the pressing member 15, and is exposed above the pressing member 15 through the opening section 15d, as shown in FIG. 8. The hand shaft 22 is positioned in the approximate center of the dial 21, and arranged to project above the housing 12 with the upper end portion thereof being positioned near the undersurface of the watch crystal 2. The hands 23 are positioned between the dial 21 and the watch crystal 2, and move with the rotation of the hand shaft 22.

As in the case of the first embodiment, the buffer member 5 composed of Alpha GEL is arranged between the wristwatch case 1 and the pressing member 15. This buffer member 5 is also composed of the first Alpha GEL section 16 to third Alpha GEL section 18, and the first Alpha GEL section 16 to third Alpha GEL section 18 are integrally formed by two-color formation, as in the case of the first embodiment.

In this instance as well, the overall first Alpha GEL section 16 is formed into an substantially cylindrical shape and arranged on the top surface and the side surface of the pressing member 15 excluding predetermined portions corresponding to the 3 o'clock position, the 6 o'clock position, the 9 o'clock position, and the 12 o'clock position, as in the case of the first embodiment. The second Alpha GEL section 17 is formed thicker than the first Alpha GEL section 16, and arranged on four portions of the top surface and the side surface of the pressing member 15 which correspond to the 3 o'clock position, the 6 o'clock position, the 9 o'clock position, and the 12 o'clock position and does not include the area of the first Alpha GEL section 16, with space there between.

The third Alpha GEL section 18 is formed thicker than the first Alpha GEL section 16, and arranged on the peripheral edge portion of the top surface of the dial 21 to be positioned on the inner peripheral edge of the top surface of the first Alpha GEL section 16, as shown in FIG. 8. The property of the gel material of the third Alpha GEL section 18 differs from those of the first Alpha GEL section 16 and the second Alpha GEL section 17.

That is, unlike the first embodiment, the third Alpha GEL section 18 is composed of a material whose hardness is lower than those of the first Alpha GEL section 16 and the second Alpha GEL section 17. Note that, although the material property differs from those of the first Alpha GEL section 16 and the second Alpha GEL section 17, the third Alpha GEL section 18 is integrally formed with the first Alpha GEL section 16 and the second Alpha GEL section 17 by two-color formation.

With the shock buffering structure of the wristwatch according to the third embodiment, effects similar to those of the first embodiment are achieved. Also, in this shock buffering structure, among the first Alpha GEL section 16 to third Alpha GEL section 18, the third Alpha GEL section 18 is formed to be thick and to have a lower degree of hardness than the first Alpha GEL section 16 and the second Alpha GEL section 17. Therefore, when the watch crystal 2 receives shock from above, the first Alpha GEL section 16 and the second Alpha GEL section 17 can change their shape after the third Alpha GEL section 18 changes its shape. In addition, shock can be absorbed and mitigated by the third Alpha GEL section 18 so as not to be transmitted to the dial 21.

Therefore, even when the top surface of the watch crystal 2 receives shock, the watch module 4 is favorably protected by the first Alpha GEL section 16 to third Alpha GEL section 18, as in the case of the first embodiment. In addition, the hands 23 of the watch movement 20 mounted in the watch module 4 is reliably and favorably protected by the third Alpha GEL section 18 from being shifted or becoming detached from the hand shaft 22 by the shock.

That is, even when the top surface of the watch crystal 2 receives shock, the third Alpha GEL section 18 can mitigate the bouncing of the watch movement 20 mounted in the watch module 4. Therefore, the detachment of the hands 23 from the hand shaft 22 and the disengagement of the gears 25 and 26 in the gear train mechanism 24 caused by the bouncing of the watch movement 20 in the up-down direction can be reliably and favorably prevented.

Moreover, in the shock buffering structure of the third embodiment, although the material property of the third Alpha GEL section 18 differs from those of the first Alpha GEL section 16 and the second Alpha GEL section 17 because the third Alpha GEL section 18 is composed of Alpha GEL having a lower degree of hardness than those of the first Alpha GEL section 16 and the second Alpha GEL section 17, the third Alpha GEL section 18 can be integrally formed with the first Alpha GEL section 16 and the second Alpha GEL section 17 by two-color formation. Accordingly, even when the material property of the third Alpha GEL section 18 differs from those of the first Alpha GEL section 16 and the second Alpha GEL section 17, these sections can be manufactured easily, which improves the manufacturability.

Variation Example

Next, combinations of Alpha GEL having various degrees of hardness will be described with reference to FIG. 9 and FIG. 10.

Alpha GEL is composed of a gel material whose main ingredient is silicone, and the hardness of Alpha GEL differs on the Asker C scale depending on the material property. For example, Alpha GEL having a low degree of hardness between 15 and 30 on the Asker C scale, Alpha GEL having a medium degree of hardness between 30 and 45 on the Asker C scale, and Alpha GEL having a high degree of hardness between 45 and 60 on the Asker C scale are known.

For example, in a case where the digital wristwatch according to the first embodiment is a normal shock-absorbing type, the first Alpha GEL section 16 to third Alpha GEL section 18 are each preferably set to a medium degree of hardness between 30 and 45 on the Asker C scale, as shown in FIG. 9. The shock absorbing characteristic in this case form a curved line indicated by a solid line F1 in FIG. 10. Its maximum acceleration value F1-*a* is smaller than the maximum acceleration value U-a of a curved line U for urethane resin indicated by a dashed line, and is in a position temporally delayed from the maximum value U-a. Therefore, Alpha GEL can reduce shock more efficiently than urethane resin.

In a case where the digital wristwatch according to the first embodiment is a high shock-absorbing type, the first Alpha GEL section 16 to third Alpha GEL section 18 are each preferably set to a high degree of hardness between 45 and 60 on the Asker C scale. The shock absorbing characteristic in this case form a curved line indicated by a solid line F2 in FIG. 10. Its maximum acceleration value F2-*a* is smaller than the maximum acceleration value U-a of the curved line U for urethane resin indicated by the dashed line, and is in a position temporally delayed from the maximum value U-a. However, the maximum acceleration value F2-*a* is greater than the maximum acceleration value F1-*a* indicated by the solid line F1, and is in a temporally earlier position. In this case as well, Alpha GEL can reduce shock more efficiently than urethane resin.

In a case where the digital wristwatch according to the second embodiment is a normal shock-absorbing type, the first Alpha GEL section 16 to third Alpha GEL section 18 are each preferably set to a medium degree of hardness between 30 and 45 on the Asker C scale, as shown in FIG. 9. The shock absorbing characteristic in this case form the curved line indicated by the solid line F1 in FIG. 10. Its maximum acceleration value F1-*a* is smaller than the maximum acceleration value U-a of the curved line U for urethane resin indicated by the dashed line, and is in a position temporally delayed from the maximum value U-a. Therefore, Alpha GEL can reduce shock more efficiently than urethane resin.

In a case where the digital wristwatch according to the second embodiment is a high shock-absorbing type, the first Alpha GEL section 16 to third Alpha GEL section 18 are each preferably set to a high degree of hardness between 45 and 60 on the Asker C scale. The shock absorbing characteristic in this case form the curved line indicated by the solid line F2 in FIG. 10. Its maximum acceleration value F2-*a* is smaller than the maximum acceleration value U-a of the curved line U for urethane resin indicated by the dashed line, and is in a position temporally delayed from the maximum value U-a. However, the maximum value F2-*a* is greater than the maximum acceleration value F1-*a* indicated by the solid line F1, and is in a temporally earlier position. In this case as well, Alpha GEL can reduce shock more efficiently than urethane resin.

In a case where the analog wristwatch according to the third embodiment is a normal shock-absorbing type, the first Alpha GEL section 16 and the second Alpha GEL section 17 are preferably set to a medium degree of hardness between 30 and 45 on the Asker C scale, and the third Alpha GEL section 18 is preferably set to a low degree of hardness between 15 and 30 on the Asker C scale which is lower than the degree of hardness of the first Alpha GEL section 16 and the second Alpha GEL section 17, as shown in FIG. 9.

Figure 10:
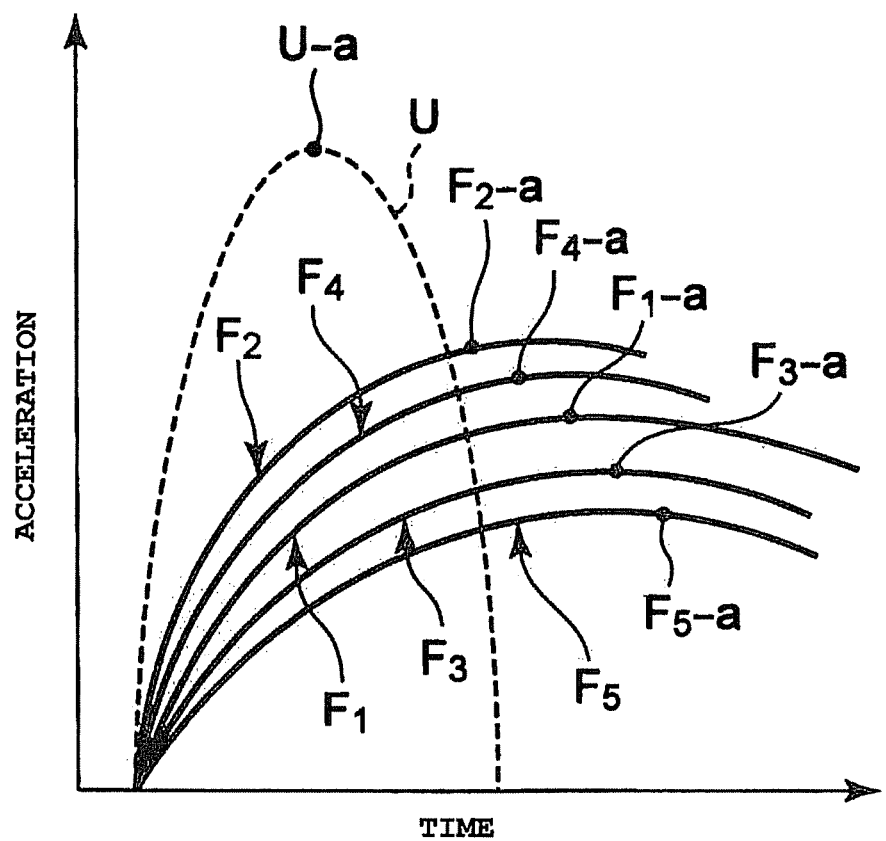
FIG. 10 is a schematic diagram showing the time-dependent changes of shock acceleration applied to a watch module when shock as external force is applied to Alpha GEL and urethane resin, in the combinations of the hardness of the first to third Alpha GEL sections shown in FIG. 9.

The shock absorbing characteristic in this case form a curved line indicated by a solid line F3 in FIG. 10. Its maximum acceleration value F3-*a* is smaller than the maximum acceleration value U-a of the curved line U for urethane resin indicated by the dashed line, and is in a position temporally delayed from the maximum value U-a. Also, the maximum acceleration value F3-a is slightly smaller than the maximum acceleration value F1-a indicated by the solid line F1, and is in a slightly delayed position. Therefore, shock can be more efficiently reduced compared to the case indicated by the solid line F1.

In a case where the analog wristwatch according to the third embodiment is a high shock-absorbing type, the first Alpha GEL section 16 and the second Alpha GEL section 17 are preferably set to a high degree of hardness between 45 and 60 on the Asker C scale, and the third Alpha GEL section 18 is preferably set to a medium degree of hardness between 30 and 45 on the Asker C scale which is lower than the degree of hardness of the first Alpha GEL section 16 and the second Alpha GEL section 17. The shock absorbing characteristic in this case form a curved line indicated by solid line F4 shown in FIG. 10. Its maximum acceleration value F4-a is positioned between the solid line F1 and the solid line F2. In this case as well, shock can be more efficiently reduced compared to the case indicated by the solid line F2.

In a case where a wristwatch of a different model is a low shock-absorbing type, the first Alpha GEL section 16 to third Alpha GEL section 18 are each preferably set to a low degree of hardness between 15 and 30 on the Asker C scale, as shown in FIG. 9. The shock absorbing characteristic in this case form a curved line indicated by a solid line F5 in FIG. 10. Its maximum acceleration value F5-a is smaller than the maximum acceleration value F3-a indicated by the solid line F3, and is in a position temporally delayed from the maximum value F3-a. Therefore, shock can be more efficiently reduced compared to the case indicated by the solid line F3.

As described above, the first Alpha GEL section 16 to third Alpha GEL section 18 may be set to the same degree of hardness or may be set to different degrees of hardness depending on the functions of the watch module 4. As a result of a high degree of hardness and a low degree of hardness being combined as described above, the first Alpha GEL section 16 to third Alpha GEL section 18 can more effectively absorb and mitigate shock.

In the above-described first to third embodiments, the auxiliary buffer section 16c is provided in the top surface section 16a of the first Alpha GEL section 16, and the auxiliary buffer projection section 16d is provided on the side surface section 16b of the first Alpha GEL section 16. However, the present invention is not limited thereto. The auxiliary buffer section 16c may be provided in the side surface section 16b of the first Alpha GEL section 16, and the auxiliary buffer projection section 16d may be provided on the top surface section 16a of the first Alpha GEL section 16.

In addition, the auxiliary buffer section 16c and the auxiliary buffer projection section 16d may each be formed in both the top surface section 16a and the side surface section 16b of the first Alpha GEL section 16. Moreover, the first Alpha GEL section 16 is not necessarily required to include the bellows-like auxiliary buffer section 16c and the auxiliary buffer projection section 16d.

Also, in the above-described first to third embodiments, the buffer member 5 arranged between the inner surface of the wristwatch case 1 and the outer surface of the housing 12 of the watch module 4 includes the pressing member 15 arranged on the outer surface of the housing 12. However, the pressing member 15 is not necessarily required to be provided and, for example, the buffer member 5 composed of Alpha GEL may be arranged directly on the outer surface of the housing 12.

Furthermore, in the above-described first to third embodiments and the variation example, the present invention has been applied to the digital-model wristwatch including the display panel 13 or the analog-model wristwatch including the hands 23. However, the present invention is not limited thereto. The present invention can be applied to a combination-type wristwatch including both digital functions and analog functions. In addition, the present invention is not necessarily required to be applied to a wristwatch, and can be applied to various clocks, such as a travel clock, an alarm clock, a mantelpiece clock, and a wall clock.

Still further, the present invention is not necessarily required to be applied to a clock, and can be widely applied to various electronic devices, such as a mobile phone, an electronic dictionary, a personal digital assistant (PDA), and a personal computer.

While the present invention has been described with reference to the preferred embodiments, it is intended that the invention be not limited by any of the details of the description therein but includes all the embodiments which fall within the scope of the appended claims.

What is claimed is:

1. A shock buffering structure of an electronic device which absorbs shock by interposing a buffer member between a device case and a module housed inside the device case,
wherein the buffer member is composed of a viscoelastic body which, when the device case receives shock, reduces the shock to be transmitted to the module by changing shape in proportion to a magnitude of the shock while converting kinetic energy to heat energy, and quickly reduces elastic force on the module by reducing conversion of the kinetic energy to elastic energy accompanying the shape change, and
the viscoelastic body is composed of a first viscoelastic body section, a second viscoelastic body section, and a third viscoelastic body section, of which the first viscoelastic body section is formed into a cylindrical shape to cover a top surface and a side surface of the module, the second viscoelastic body section is arranged in predetermined portions of the first viscoelastic body section with space therebetween, and the third viscoelastic body section is arranged in a frame shape along an inner peripheral edge of a top surface of the first viscoelastic body section positioned on the top surface of the module.

2. The shock buffering structure of the electronic device according to claim 1, wherein the electronic device is a clock, and the predetermined portions are four portions of the first viscoelastic body section corresponding to a 3 o'clock position, a 6 o'clock position, a 9 o'clock position, and a 12 o'clock position, which are located with space therebetween.

3. The shock buffering structure of the electronic device according to claim 1, wherein shock acceleration to be applied to the module when shock is applied to the module via the buffer member is 50% or less, or 30% or less, compared to shock acceleration to be applied to the module when shock is applied to the module without the buffer member.

4. The shock buffering structure of the electronic device according to claim 1, wherein the viscoelastic body has a material property selected based on mass of the electronic device such that a natural frequency is lower than a vibration frequency set in advance which is related to damage to electronic components constituting the module.

5. The shock buffering structure of the electronic device according to claim 1, wherein the buffer member is a resin material whose main ingredient is silicone resin.

6. The shock buffering structure of the electronic device according to claim 1, wherein the second viscoelastic body section is formed thicker than the first viscoelastic body section, and the first viscoelastic body section has formed thereon a projection that projects in a thickness direction of the first viscoelastic body section.

7. The shock buffering structure of the electronic device according to claim 1, wherein the third viscoelastic body section is formed thicker than the first viscoelastic body section.

8. The shock buffering structure of the electronic device according to claim 1, wherein the device case has a display protective glass, the module has hands which indicate and display time corresponding to the protective glass, the third viscoelastic body section is arranged corresponding to an area of an inner surface of the protective glass, and hardness of the third viscoelastic body section is set lower than hardness of the first viscoelastic body section and the second viscoelastic body section.

9. The shock buffering structure of the electronic device according to claim 1, wherein the first viscoelastic body section, the second viscoelastic body section, and the third viscoelastic body section are integrally formed using a same material.

10. The shock buffering structure of the electronic device according to claim 1, wherein the first viscoelastic body section, the second viscoelastic body section, and the third viscoelastic body section are formed using different materials by multi-color formation.

11. The shock buffering structure of the electronic device according to claim 1, wherein the device case has an external member provided on an outer front surface thereof, which is constituted by an inner external section provided on an outer surface of the device case, and an outer external section provided on an outer peripheral surface of the inner external section; and the inner external section is composed of a viscoelastic body that changes shape in proportion to impact force when the external member receives shock, and the outer external section is composed of a synthetic resin having elasticity.

12. The shock buffering structure of the electronic device according to claim 11, wherein the viscoelastic body of the inner external section is formed such that thickness of portions of the viscoelastic body located in right and left directions of a front surface of the device case is thicker than thickness of portions of the viscoelastic body located in front and back directions of the front surface.

13. An electronic device comprising:

a device case;

a module which is housed inside the device case and has electronic components mounted therein; and a buffer member which is interposed between the device case and the module, and absorbs shock;

wherein the buffer member is composed of a viscoelastic body which, when the device case receives shock, reduces the shock to be transmitted to the module by changing shape in proportion to a magnitude of the shock while converting kinetic energy to heat energy, and quickly reduces elastic force on the module by reducing conversion of the kinetic energy to elastic energy accompanying the shape change; and the viscoelastic body is composed of a first viscoelastic body section, a second viscoelastic body section, and a third viscoelastic body section, of which the first viscoelastic body section is formed into a cylindrical shape to cover a top surface and a side surface of the module, the second viscoelastic body section is arranged in predetermined portions of the first viscoelastic body section with space therebetween, and the third viscoelastic body section is arranged in a frame shape along an inner peripheral edge of a top surface of the first viscoelastic body section positioned on the top surface of the module.

14. A buffer member which is arranged between a device case and a module housed inside the device case and absorbs shock, wherein the buffer member is composed of a viscoelastic body which, when the device case receives shock, reduces the shock to be transmitted to the module by changing shape in proportion to a magnitude of the shock while converting kinetic energy to heat energy, and quickly reduces elastic force on the module by reducing conversion of the kinetic energy to elastic energy accompanying the shape change; and the viscoelastic body is composed of a first viscoelastic body section, a second viscoelastic body section, and a third viscoelastic body section, of which the first viscoelastic body section is formed into a cylindrical shape to cover a top surface and a side surface of the module, the second viscoelastic body section is arranged in predetermined portions of the first viscoelastic body section with space therebetween, and the third viscoelastic body section is arranged in a frame shape along an inner peripheral edge of a top surface of the first viscoelastic body section positioned on the top surface of the module.

* * * * *